United States Patent
Zheng et al.

(10) Patent No.: US 10,798,552 B2
(45) Date of Patent: Oct. 6, 2020

(54) EMERGENCY CALL-FOR-HELP METHOD AND SYSTEM BASED ON FINGERPRINT IDENTIFICATION FOR MOBILE TERMINAL, AND MOBILE TERMINAL

(71) Applicant: JRD COMMUNICATION (SHENZHEN) LTD., Shenzhen, Guangdong (CN)

(72) Inventors: Jiabin Zheng, Shenzhen (CN); Longxing Pan, Shenzhen (CN); Dongchi Chen, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 0 days.

(21) Appl. No.: 16/342,453

(22) PCT Filed: Sep. 5, 2017

(86) PCT No.: PCT/CN2017/100491
§ 371 (c)(1),
(2) Date: Apr. 16, 2019

(87) PCT Pub. No.: WO2018/072567
PCT Pub. Date: Apr. 26, 2018

(65) Prior Publication Data
US 2020/0053538 A1 Feb. 13, 2020

(30) Foreign Application Priority Data
Oct. 17, 2016 (CN) .......................... 2016 1 0900813

(51) Int. Cl.
*H04W 4/90* (2018.01)
*G06F 21/32* (2013.01)
(Continued)

(52) U.S. Cl.
CPC .............. *H04W 4/90* (2018.02); *G06F 21/32* (2013.01); *G06K 9/00087* (2013.01);
(Continued)

(58) Field of Classification Search
CPC ......... H04W 4/90; H04W 4/025; H04W 4/14; H04W 12/02; G06F 21/32; G06K 9/00087; H04M 1/72538; H04M 1/72541
See application file for complete search history.

(56) References Cited

U.S. PATENT DOCUMENTS 8,604,906 B1 * 12/2013 Halferty .................... G05B 1/01
340/5.83
10,204,704 B1 * 2/2019 Wurst ...................... G16Z 99/00
(Continued)

FOREIGN PATENT DOCUMENTS

CN 105554719 A 5/2016
CN 105573623 A 5/2016
(Continued)

*Primary Examiner* — Magdi Elhag
(74) *Attorney, Agent, or Firm* — Kirton McConkie; Evan R. Witt

(57) ABSTRACT

Disclosed are an emergency call-for-help method and system based on fingerprint identification for a mobile terminal, and a mobile terminal. When a user is in an emergency, a mobile terminal sends an emergency short message including positional information to emergency contacts, and automatically calls the numbers of all the emergency contacts, so as to rapidly send a call-for-help signal to the outside world, thereby guaranteeing the user's safety, reducing safety risks and being convenient for the user.

4 Claims, 4 Drawing Sheets

(51) Int. Cl.
  *G06K 9/00* (2006.01)
  *H04M 1/725* (2006.01)
  *H04W 4/02* (2018.01)
  *H04W 4/14* (2009.01)
  *H04W 12/02* (2009.01)

(52) U.S. Cl.
  CPC ....... *H04M 1/72538* (2013.01); *H04W 4/025* (2013.01); *H04W 4/14* (2013.01); *H04W 12/02* (2013.01)

(56) References Cited

U.S. PATENT DOCUMENTS

| | | | |
|---|---|---|---|
| 2004/0024706 A1 * | 2/2004 | Leduc | G06Q 20/105 |
| | | | 705/41 |
| 2012/0178409 A1 | 7/2012 | Yang | |
| 2014/0002388 A1 | 1/2014 | Han et al. | |
| 2016/0042190 A1 * | 2/2016 | Adderly | G06F 21/629 |
| | | | 726/28 |
| 2016/0066170 A1 | 3/2016 | Chien | |
| 2016/0125727 A1 | 5/2016 | Yeh | |

FOREIGN PATENT DOCUMENTS

| | | | | |
|---|---|---|---|---|
| CN | 105577925 A | | 5/2016 | |
| CN | 105681587 A | | 6/2016 | |
| CN | 106027777 A | * | 10/2016 | |
| CN | 106550118 A | | 3/2017 | |
| DE | 102012204010 B3 | | 8/2013 | |
| WO | WO-2019052215 A1 | * | 3/2019 | ........... G06F 3/0488 |

* cited by examiner

EMERGENCY CALL-FOR-HELP METHOD AND SYSTEM BASED ON FINGERPRINT IDENTIFICATION FOR MOBILE TERMINAL, AND MOBILE TERMINAL

CROSS-REFERENCE TO RELATED APPLICATIONS

The present application claims priority to China patent application number 201610900813.5, titled "EMERGENCY CALL-FOR-HELP METHOD AND SYSTEM BASED ON FINGERPRINT IDENTIFICATION FOR MOBILE TERMINAL, AND MOBILE TERMINAL", filed on 2016, Oct. 17 in the National Intellectual Property Administration of the People's Republic of China, which is incorporated in the present application in its entirety.

BACKGROUND OF INVENTION

Field of Invention

The present disclosure relates to the field of mobile terminal technologies, and more particularly to an emergency help method and system based on fingerprint identification and a mobile terminal thereof.

Description of Prior Art

In today's society, a variety of illegal, criminal, and violent incidents still occur from time to time. Especially, it is likely that women encounter various accidents and danger when they go outside alone. When danger really occurs, we need to send a help signal to the outside immediately.

It is instinctive for a human being to call for help to the outside world when in an emergency. We will yell at people nearby for help or also call our relatives, the police, or hospitals when we encounter a thief, traffic accidents, suffer from sudden diseases, or are involved in other accidents. Nevertheless, yelling out or making phone calls for help are not available in all emergencies, e.g. in cases of abduction, which are frequently reported by the press, abductors may get alert if an abductee makes phone calls or yell to the outside, which may even stimulate abductors to do some violent behaviors to the abductee and may threaten the life of the abductee. It is also not suitable to send a message under such a, because the abductee has no enough time to type messages.

Currently, there are few alert applications being employed for smart phones on the market, mainly including two types: the first type needs to turn on the screen to unlock a smart phone, then find and click the application to implement message alert finally, but this alert type has disadvantages of cumbersome operation and easily exposing target due to the lighted screen; the second type is implementing a customized phone software through long pressing a button on a smart phone to alert. This application has a high probability of misuse, such as false activation by someone else or occasional incidents, which will bring a big trouble.

In addition to the above-mentioned emergency situations, the ways of yelling for help or calling for help are also not applicable in cases of some sudden illnesses. For example, the elderly have sudden high blood pressure or heart diseases when they are alone at home, and they are unable to yell for help and make a call or send messages.

With the development of technologies, mobile devices, especially mobile phones, have become a necessity for people to carry all the time. Mobile devices are also our most important tool for calling for help when encountering dangerous situations. At present, the common one-button alert method has problems that it is very likely that the button is misused, or the button needs to be operated multiple times, and it is not convenient to operate when a dangerous situation occurs, the so-called help function is usually simply dialing an emergency number, which is not enough in many cases.

Therefore, in view of the drawbacks above, prior art still needs to be improved and developed.

SUMMARY OF INVENTION

An embodiment of the present disclosure provides an emergency help method and system based on fingerprint identification and mobile terminal thereof, which is capable of sending an emergency short message with location information to emergency contact persons and automatically using the mobile terminal to call all the emergency contact persons' numbers when the user encounters an emergency. The help signal is sent to the outside to protect user's safety, reduce safety risks, and provide convenience for user.

In a first aspect, the embodiment of the present disclosure provides a method of emergency help based on fingerprint identification for a mobile terminal, the method includes steps of:

setting a user password on a setting page of emergency help function of the mobile terminal, and recording a fingerprint of a finger to trigger a help function and adding emergency contact persons and an emergency message;

obtaining current location information and adding the current location information into edited emergency message, sending the emergency message with the location information to all emergency contact persons when an emergency occurs and the mobile terminal recognizes the fingerprint information successfully; and the mobile terminal automatically dials all emergency contact persons' numbers in an order of emergency contact persons after the emergency message with the location information is sent.

According to the method of emergency help based on fingerprint identification for a mobile terminal, the step of setting the user password on the setting page of emergency help function of the mobile terminal, and recording the fingerprint of the finger to trigger the help function and adding emergency contact persons and the emergency message, specifically includes steps of:

inputting the user password on the setting page of emergency help function for accessing the setting page of emergency help function subsequently when the user enters a backstage interface of the emergency help function of the mobile terminal for the first time;

recording the fingerprint of the finger to trigger the help function by using a fingerprint collecting module of the mobile terminal when the user password is set successfully, wherein the finger is one of all fingers of the user;

adding several emergency contact persons in an emergency contact person list after the fingerprint is recorded successfully, wherein the order of the emergency contact persons is set as a first emergency contact person, a second emergency contact person, a third emergency contact person, etc., to an Nth emergency contact person according to an importance of each emergency contact person; and editing and saving content of emergency message for all emergency contact persons, then turning on a switch of the emergency help function when the emergency contact persons are set completely.

According to the method of emergency help based on fingerprint identification for a mobile terminal, the step of obtaining current location information and adding the current location information into the edited emergency message, sending the emergency message with the location information to all emergency contact persons when the emergency occurs and the mobile terminal recognizes the fingerprint information successfully, specifically includes steps of:

a fingerprint identification module of the mobile terminal receiving and verifying the finger information of the prerecorded fingerprint when the emergency occurs;

re-verifying the prerecorded fingerprint or changing another finger for verifying if verification of the fingerprint fails, then triggering the help function if the fingerprint is successfully verified longer than a predetermined time; and the mobile terminal obtaining the current location information according to a Global Positioning System (GPS) positioning module and adding the current location information into the edited emergency message, then sending the emergency message with the location information to all emergency contact persons after the help function is triggered.

According to the method of emergency help based on fingerprint identification for a mobile terminal, the step of the mobile terminal automatically dials all emergency contact persons' numbers in the order of emergency contact persons after the emergency message with the location information is sent, specifically includes steps of:

the mobile terminal setting sending frequencies as five minutes, fifteen minutes, and an hour, the emergency message with location information is sent according to the sending frequencies; and the mobile terminal automatically dialing the first emergency contact person's number after the emergency message with location information is sent, a current call being terminated if the fingerprint identification module is pressed again longer than a predetermined time, and then the mobile terminal dialing next emergency contact person's number, until all emergency contact persons' numbers are dialed or an emergency contact person takes the call.

According to the method of emergency help based on fingerprint identification for a mobile terminal, the times after triggering the emergency help function are set as three phases for within two hours, within twenty-four hours, and within a week respectively.

According to the method of emergency help based on fingerprint identification for a mobile terminal, the predetermined time are five seconds.

In a second aspect, the embodiment of the present disclosure provides an emergency help system based on fingerprint identification for a mobile terminal, the emergency help system includes:

a fingerprint collecting module configured to record a fingerprint of a finger of a user for triggering help function;

a fingerprint identification module configured to receive and verify the finger information of the prerecorded fingerprint;

a Global Positioning System (GPS) positioning module configured to obtains a current location information of the user when an emergency occurs;

a pre-setting module configured to set a user password on a setting page of emergency help function of the mobile terminal, then configured to record the fingerprint of the finger for triggering help function by using the fingerprint collecting module and add emergency contact persons and an emergency message;

a message sending module configured to obtain the current location information by using the GPS positioning module and add the current location information into an edited emergency message then send the emergency message to all emergency contact persons when an emergency occurs and the fingerprint identification module recognizes the fingerprint information successfully; and an automatic communicating module configured to dial all emergency contact persons' numbers in an order of emergency contact persons after the emergency message with the location information is sent.

According to the emergency help system based on fingerprint identification for a mobile terminal, the pre-setting module specifically includes:

a password setting unit configured to input the user password on the setting page of emergency help function for accessing the setting page of emergency help function subsequently when the user enters a backstage interface of the emergency help function of the mobile terminal for the first time;

a fingerprint recording unit configures to record the fingerprint of the finger to trigger the help function by using the fingerprint collecting module when the user password is set successfully, wherein the finger is one of all fingers of the user;

a contact person setting unit configured to add several emergency contact persons in an emergency contact person list after the fingerprint is recorded successfully, wherein the order of the emergency contact persons is set as a first emergency contact person, a second emergency contact person, a third emergency contact person, etc., to an Nth emergency contact person according to an importance of each emergency contact person; and a message editing unit configured to edit and save content of emergency message for all emergency contact persons, then turn on a switch of the emergency help function when the emergency contact persons are set completely.

According to the emergency help system based on fingerprint identification for a mobile terminal, the message sending module specifically includes:

a fingerprint verifying unit configured to receive and verify the finger information of the prerecorded fingerprint when the emergency occurs;

a help triggering unit configured to re-verify the prerecorded fingerprint or change another finger for verifying if verification of the fingerprint fails, then trigger the help function if the fingerprint is successfully verified longer than a predetermined time; and a location adding unit configured to obtain the current location information according to the GPS positioning module and add the current location information into the edited emergency message, then send the emergency message to all emergency contact persons after the help function is triggered.

According to the emergency help system based on fingerprint identification for a mobile terminal, the automatic communicating module specifically includes:

a message sending frequency setting unit configured to set sending frequencies as five minutes, fifteen minutes, and an hour, the emergency message with location information is sent according to the sending frequencies; and a circulating calling unit configured to automatically dial the first emergency contact person's number after the emergency message with location information is sent, a current call being terminated if the fingerprint identification module is pressed again longer than a predetermined time, and then the mobile terminal dialing next emergency contact person's number, until all emergency contact persons' numbers are dialed or an emergency contact person takes the call.

In a third aspect, the embodiment of the present disclosure provides a mobile terminal including a processor and a storage, the storage is configured to store instructions and data, the processor is configured to implement following steps of:

setting a user password on a setting page of emergency help function of the mobile terminal, and recording a fingerprint of a finger to trigger a help function and adding emergency contact persons and an emergency message;

editing and saving content of emergency message for all emergency contact persons, then turning on a switch of the emergency help function when the emergency contact persons are set and the emergency message is edited completely for automatically sending messages and making phone calls if the emergency help function is triggered, wherein the contact persons are selected from a contact persons list in a phone book of the mobile terminal or the contact persons are newly added;

obtaining current location information and adding the current location information into edited emergency message, sending the emergency message with the location information to all emergency contact persons when an emergency occurs and the mobile terminal recognizes the fingerprint information successfully; and the mobile terminal automatically dialing all emergency contact persons' numbers in an order of emergency contact persons after the emergency message with the location information is sent.

Further, in the mobile terminal, in the step of setting the user password on the setting page of emergency help function of the mobile terminal, and recording the fingerprint of the finger to trigger the help function and adding emergency contact persons and the emergency message, the processor is further configured to implement steps of:

inputting the user password on the setting page of emergency help function for accessing the setting page of emergency help function subsequently when the user enters a backstage interface of the emergency help function of the mobile terminal for the first time;

recording the fingerprint of the finger to trigger the help function by using a fingerprint collecting module of the mobile terminal when the user password is set successfully, wherein the finger is one of all fingers of the user;

adding several emergency contact persons in an emergency contact person list after the fingerprint is recorded successfully, wherein the order of the emergency contact persons is set as a first emergency contact person, a second emergency contact person, a third emergency contact person, etc., to an Nth emergency contact person according to an importance of each emergency contact person; and editing and saving content of emergency message for all emergency contact persons, then turning on a switch of the emergency help function when the emergency contact persons are set completely.

Further, in the mobile terminal, in the step of obtaining current location information and adding the current location information into the edited emergency message, sending the emergency message with the location information to all emergency contact persons when the emergency occurs and the mobile terminal recognizes the fingerprint information successfully, the processor is further configured to implement steps of:

a fingerprint identification module of the mobile terminal receiving and verifying the finger information of the prerecorded fingerprint when the emergency occurs;

re-verifying the prerecorded fingerprint or changing another finger for verifying if verification of the fingerprint fails, then triggering the help function if the fingerprint is successfully verified longer than a predetermined time; and the mobile terminal obtaining the current location information according to a Global Positioning System (GPS) positioning module and adding the current location information into the edited emergency message, then sending the emergency message with the location information to all emergency contact persons after the help function is triggered.

Further, in the mobile terminal, in the step of the mobile terminal automatically dialing all emergency contact persons' numbers in the order of emergency contact persons after the emergency message with the location information is sent, the processor is further configured to implement steps of:

the mobile terminal setting sending frequencies of the emergency message as five minutes, fifteen minutes, and an hour, the emergency message with location information is sent according to the sending frequencies; and the mobile terminal automatically dialing the first emergency contact person's number after the emergency message with location information is sent, a current call being terminated if the fingerprint identification module is pressed again longer than a predetermined time, and then the mobile terminal dialing next emergency contact person's number, until all emergency contact persons' numbers are dialed or an emergency contact person takes the call.

Further, in the mobile terminal, times after triggering the emergency help function are set as three phases for within two hours, within twenty-four hours, and within a week respectively.

Further, in the mobile terminal, the predetermined time are five seconds.

The present disclosure discloses an emergency help method and system based on fingerprint identification and a mobile terminal thereof, the method of emergency help based on fingerprint identification for a mobile terminal includes: setting a user password on a setting page of emergency help function of the mobile terminal, and then recording a fingerprint of a finger to trigger a help function and adding emergency contact persons and an emergency message; obtaining current location information and adding the current location information into edited emergency message, sending the emergency message to all emergency contact persons when an emergency occurs and the mobile terminal recognizes the fingerprint information successfully; the mobile terminal automatically dials all emergency contact persons' numbers in an order of emergency contact persons after the emergency message with the location information is sent. The present disclosure is directed to send emergency message with location information to emergency contact persons and automatically dial all emergency contact persons' numbers through the mobile terminal when the user encounters an emergency, until all emergency contact persons have finished calling or a called emergency contact person takes the call. The present disclosure can effectively and quickly send a help signal to outside to protect user's safety, reduce safety risks, and provide convenience for users.

DETAILED DESCRIPTION OF INVENTION

In order to illustrate the technical solutions of the embodiments of the present disclosure more clearly, following detailed description and drawings with reference to the exemplary embodiments of the present disclosure are concisely described below. It should be understood that the specific embodiments described herein are only illustrative of the present disclosure and not intended to limit the invention.

Figure 1:
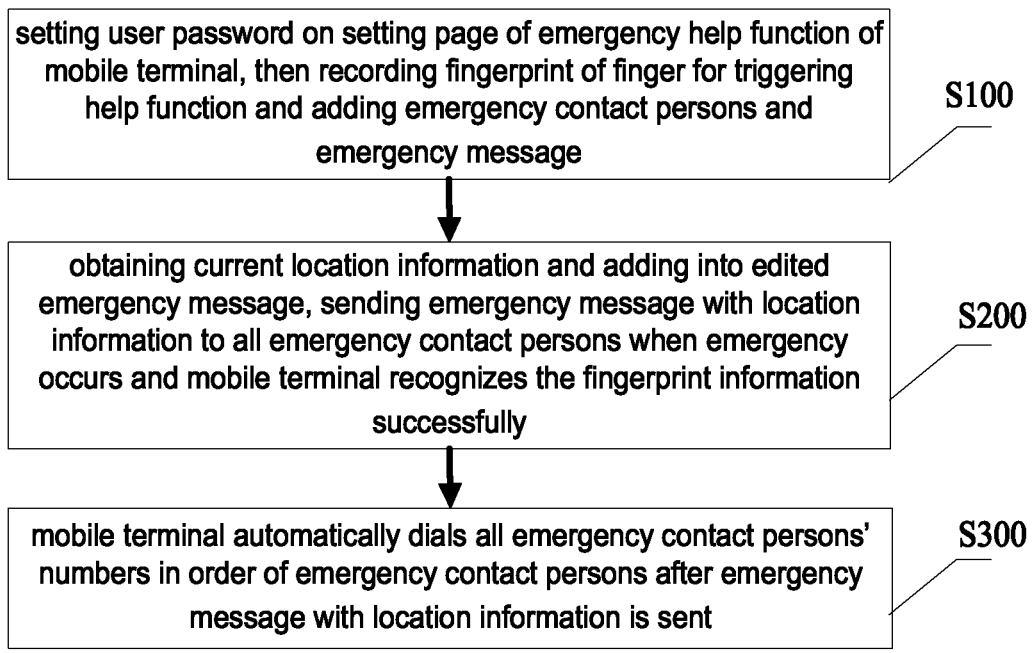
FIG. 1 is a flowchart of an embodiment of an emergency help method based on fingerprint identification for a mobile terminal according to the present disclosure.

Referring to FIG. 1, FIG. 1 is a flowchart of an embodiment of an emergency help method based on fingerprint identification for a mobile terminal according to the present disclosure. The emergency help method based on fingerprint identification for the mobile terminal according to the present disclosure shown in FIG. 1 includes the following steps:

Step 100: A user password is set on a setting page of emergency help function of the mobile terminal, and a fingerprint of a finger is recorded for triggering a help function and emergency contact persons and an emergency message are added. In the present disclosure, the user password is input on the setting page of emergency help function for accessing the setting page of emergency help function subsequently when a user enters a backstage interface of the emergency help function of the mobile terminal for the first time. The password can be set with a combination of numbers and letters or gestures. Specifically, the password can be set according to the password setting way provided on the mobile terminal. A fingerprint collecting module of the mobile terminal is used to record the fingerprint of the finger for triggering the help function when the user password is set successfully. The finger is selected from one of all fingers of the user, that is, the user can select one of the ten fingers and put a front end of the selected finger on a fingerprint collecting window for recording the fingerprint, and the same fingerprint is needed to be confirmed again after a first recording.

After the fingerprint is successfully recorded, a number of emergency contact persons are added to the emergency contact person list, and the contact person can be selected from the contact person list in an address book of the mobile terminal, or can be a newly added contact person. Generally, the contact person depicted here is a person who has a close relationship with the user, such as parents, siblings, and important friends who live in same place. The user can select an emergency contact person according to the user's actual situation without limitation. The emergency contact person is set as: a first emergency contact person, a second emergency contact person, a third emergency contact person, etc., to an Nth emergency contact person according to the importance of each emergency contact person. Generally, appropriate numbers of emergency contact persons are not more than five, and numbers of emergency contact persons are preferably three.

After the emergency contact persons are set completely, content of emergency message for all emergency contact persons is edited and saved. The content of the message is not limited. The subject of the message is that the user is currently in a dangerous condition and needs the help of the emergency contact persons. For example, the content of the message can be set as: "I am being held now in dangers, asking for help". When the content of the message is edited completely, a switch of emergency help function is turned on, that is, after the emergency call is triggered in the future, the messages delivery and the phone calls can be implemented automatically.

In addition, for the accessing password and the recorded fingerprint which are already set, the user can enter the setting page of emergency help function with the password or the finger fingerprint, and then perform corresponding settings, such as changing the emergency contact person list, re-editing the content of message, and the like.

Step 200: a current location information is obtained and added into the edited emergency message, and the edited emergency message with the location information is sent to all emergency contact persons when an emergency occurs and the mobile terminal recognizes the fingerprint information successfully.

In the present disclosure, when an emergency occurs, the fingerprint identification module of the mobile terminal receives the finger information of the user's pre-recorded fingerprint and performs verification, that is, the user finds himself in a dangerous condition, for example, the user is seized by a stranger, and the user can immediately secretly put the finger with previously recorded fingerprint on the fingerprint identification module for fingerprint verification. If the fingerprint verification fails (the possibility of this situation is very small, but it is still possible), the prerecorded fingerprint is re-verified or replaced by another finger for verifying (it is possible that the user forgets the finger with prerecorded fingerprint in the emergency condition). The help function is triggered if the fingerprint is successfully verified longer than a predetermined time (the predetermined time are preferably 5 seconds, the predetermined time should not be too long or too short, it is disadvantageous to the user if the predetermined time is too long, because the user's fingerprint may not be verified for a long time due to an external reason, and the fingerprint may not be verified yet If the predetermined time is too short). When the help function is triggered, the mobile terminal obtains the current location information according to a Global Positioning System (GPS) positioning module and adds it to the edited emergency message, for example, if the user is at No. 35 Nanjing Road, Shanghai City, then the GPS positioning module locates the location information, the content of the emergency message is set as: "I am now seized, very dangerous, asking for help, No. 35 Nanjing Road, Shanghai City", and the message is sent to all emergency contact persons, the emergency contact persons are asked to take appropriate actions after receiving the message.

Step 300: the mobile terminal automatically dials all emergency contact persons' numbers in an order of emergency contact persons after the emergency message with the location information is sent.

In the present disclosure, time after the emergency help function is triggered is set as three phases: within two hours, within twenty-four hours, and within a week respectively. The mobile phone sets message sending frequencies as five minutes, fifteen minutes, and an hour respectively for sending the emergency message with location information according to the sending frequencies, that is, the mobile terminal sends the emergency message to all emergency contact persons for every five minutes within two hours after the emergency help function is triggered, the mobile terminal sends the emergency message to all emergency contact persons for every fifteen minutes within two to twenty-four hours after the emergency help function is triggered, and, the mobile terminal sends the emergency message to all emergency contact persons every hour within twenty-four hours to two weeks after the emergency help function is triggered. This is to make the emergency contact persons receive the emergency message and conduct appropriate actions in a shortest time for reducing the user's chance of being hurt when the user is in emergency.

The mobile terminal automatically dials the first emergency contact person's number after the emergency message with location information is sent, a current call will be terminated if the fingerprint identification module is pressed again longer than a predetermined time (the predetermined time is preferably five seconds), and then the mobile terminal dials next emergency contact person's number until all emergency contact persons' numbers are dialed or an emergency contact person takes the call.

In addition, the functions above are not affected after the mobile terminal is restarted. If there is a need to turn off the emergency help function, the password is needed to be entered or the fingerprint is needed to be verified for entering the setting page of the emergency help function to turn off the functions above.

Figure 2:
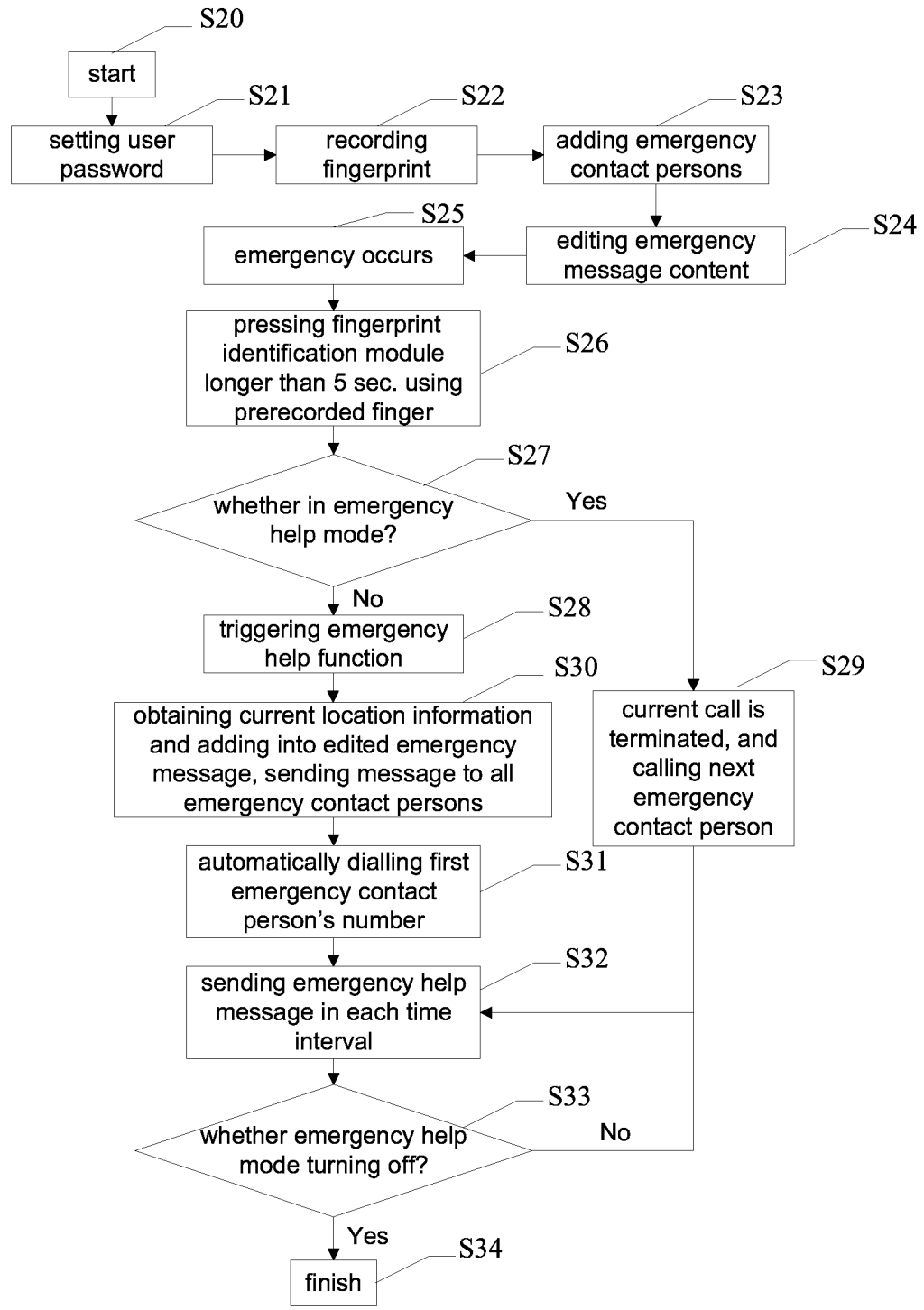
FIG. 2 is a detailed flowchart of an embodiment of an emergency help method based on fingerprint identification for a mobile terminal according to the present disclosure.

In order to make the emergency help method based on the fingerprint identification for the mobile terminal of the present disclosure more clear, a flow of the specific embodiment is illustrated as below. Referring to FIG. 2, FIG. 2 is a flowchart of a specific embodiment of an emergency help method based on fingerprint identification for a mobile terminal according to the present disclosure.

As shown in FIG. 2, the flowchart of the specific embodiment includes:

step of S20: the flow starts;
step of S21: a user password is input on the setting page of emergency help function for accessing the setting page of emergency help function subsequently when a user enters a backstage interface of the emergency help function of the mobile terminal for the first time;
step of S22: the fingerprint of the finger for triggering the help function is recorded by using a fingerprint collecting module of the mobile terminal;
step of S23: several emergency contact persons are added in an emergency contact person list in an order according to the importance of the emergency contact persons;
step of S24: the content of emergency message is edited and saved for all emergency contact persons;
step of S25: an emergency occurs;
step of S26: the fingerprint identification module is pressed longer than five seconds by using the prerecorded finger;
step of S27: the mobile terminal is determined whether it is in an emergency help mode, if it is not in the emergency help mode, then proceeds to step of S28, if it is in the emergency help mode, then proceeds to step of S29;
step of S28: the emergency help function is not turned on yet, the emergency help function is triggered then proceeds to step of S30;
step of S29: the emergency help function is turned on, a current call is terminated and the mobile terminal calls next emergency contact person and proceeds to step of S32 continuously;
step of S30: the mobile terminal obtains the current location information by using the GPS positioning module and the current location information is added into the edited emergency message then the emergency message is sent to all emergency contact persons;
step of S31: the mobile terminal automatically dials the first emergency contact person's number after the emergency message with the location information is sent;
step of S32: the emergency message is sent out at a specific time interval;
step of S33: the emergency help mode is determined whether it is turned off, if the emergency help mode is turned off, then proceeds to step of S34, if the emergency help mode is not turned off then proceeds to steps of S29 and S33;
step of S34: the emergency help mode is turned off and the flow is finished.

Figure 3:
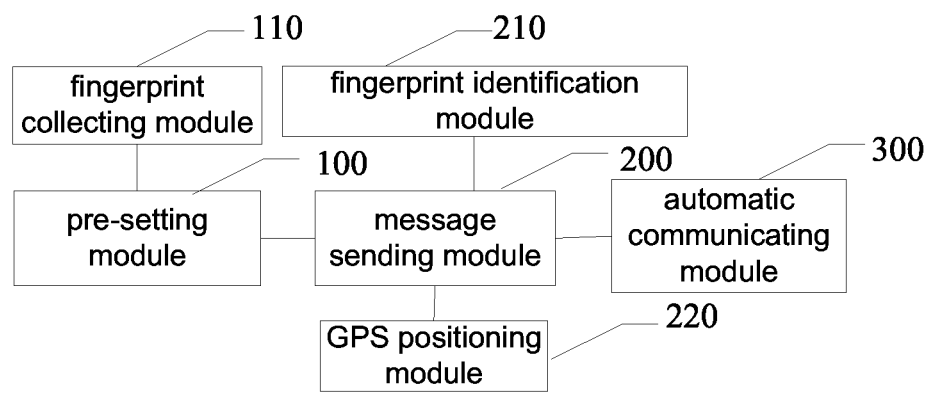
FIG. 3 is a functional block diagram of an embodiment of an emergency help system based on fingerprint identification for a mobile terminal according to the present disclosure.

Based on the abovementioned embodiments, the present disclosure further provides an emergency help system based on fingerprint identification for a mobile terminal. Referring to FIG. 3, FIG. 3 is a functional block diagram of an embodiment of the emergency help system based on fingerprint identification for a mobile terminal according to the present disclosure.

As shown in FIG. 3, the system includes:
a fingerprint collecting module 110 is configured to record the fingerprint of a finger for triggering the help function, as abovementioned specifically;
a fingerprint identification module 210 is configured to receive and verify the finger information of the prerecorded fingerprint, as abovementioned specifically;
a GPS positioning module 220 is configured to obtain a current location information of the user when an emergency occurs, as abovementioned specifically.

The system further includes:
a pre-setting module 100 is configured to set a user password on a setting page of emergency help function of the mobile terminal, then is configured to record the fingerprint of the finger for triggering help function by using the fingerprint collecting module and add emergency contact persons and an emergency message, as abovementioned specifically;
a message sending module 200 is configured to obtain the current location information by using the GPS positioning module and add the current location information into the edited emergency message, then send the emergency message to all emergency contact persons when the emergency occurs and the fingerprint identification module recognizes the fingerprint information successfully, as abovementioned specifically;
an automatic communicating module 300 is configured to dial all emergency contact persons' numbers in the order of emergency contact persons after the emergency message with the location information is sent, as abovementioned specifically.

Further, in the emergency help system based on fingerprint identification for the mobile terminal, the pre-setting module 100 specifically includes:
a password setting unit is configured to input the user password on the setting page of emergency help function for accessing the setting page of emergency help function subsequently when the user enters the backstage interface of the emergency help function of the mobile terminal for the first time, as abovementioned specifically;

a fingerprint recording unit is configured to record the fingerprint of the finger for triggering the help function by using the fingerprint collecting module when the user password is set successfully, wherein the finger is one of all fingers of the user, as abovementioned specifically;

a contact person setting unit is configured to add several emergency contact persons in the emergency contact person list after the fingerprint is recorded successfully, wherein the order of the emergency contact persons is set as a first emergency contact person, a second emergency contact person, a third emergency contact person, etc., to an Nth emergency contact person according to the importance of emergency contact persons, as abovementioned specifically; and a message editing unit is configured to edit and save content of the emergency message for all emergency contact persons, then the switch of the emergency help function is turned on when the emergency contact persons are set completely, as abovementioned specifically.

In the emergency help system based on fingerprint identification for the mobile terminal, the message editing unit specifically includes:

a fingerprint verifying unit is configured to receive and verify the finger information of the prerecorded fingerprint when the emergency occurs, as abovementioned specifically;

a help triggering unit is configured to re-verify the prerecorded fingerprint or change another finger for verifying if verification of the fingerprint fails, then trigger the help function if the fingerprint is successfully verified longer than a predetermined time, as abovementioned specifically;

a location adding unit is configured to obtain the current location information according to the GPS positioning module and add the current location information into the edited emergency message, then send the emergency message to all emergency contact persons after the help function is triggered, as abovementioned specifically.

In the emergency help system based on fingerprint identification for the mobile terminal, the automatic communicating module specifically includes:

a message sending frequency setting unit is configured to set sending frequencies as five minutes, fifteen minutes, and an hour, the emergency message with location information is sent according to the sending frequencies, as abovementioned specifically;

a circulating calling unit is configured to automatically dial the first emergency contact person's number after the emergency message with location information is sent, a current call is terminated if the fingerprint identification module is pressed again longer than a predetermined time, and then the mobile terminal dials next emergency contact person's number, until all emergency contact persons' numbers are dialed or an emergency contact person takes the call, as abovementioned specifically.

In summary, the present disclosure discloses an emergency help method and system based on fingerprint identification for a mobile terminal. The method includes: a user password is input on a setting page of emergency help function of the mobile terminal, then the fingerprint of a finger for triggering the help function is recorded and emergency contact persons and the emergency message are added; the current location information is obtained and added into the edited emergency message, then the emergency message is sent to all emergency contact persons when the emergency occurs and the mobile terminal recognizes the fingerprint information successfully; the mobile terminal automatically dials all emergency contact persons' numbers in the order of emergency contact persons after the emergency message with the location information is sent. The present disclosure is directed to send an emergency message with location information to emergency contact persons and automatically dial all emergency contact persons' numbers by using the mobile terminal when the user encounters an emergency, until all emergency contact persons are called or a called emergency contact takes the call. It can effectively and quickly send a help signal to the outside to protect the user's safety, reduce safety risks, and provide convenience for users.

The embodiments of the present disclosure provide a storage medium storing a computer program, wherein the computer program enables a computer to implement the emergency help method based on fingerprint identification of the mobile terminal as described above.

A person skilled in the art may understand that all or some of the steps of the foregoing embodiments may be implemented by using a program to instruct related hardware. The program may be stored in a computer readable storage medium, and the storage medium may include a read only memory (ROM), random access memory (RAM), magnetic disk or optical disk, etc.

Figure 4:
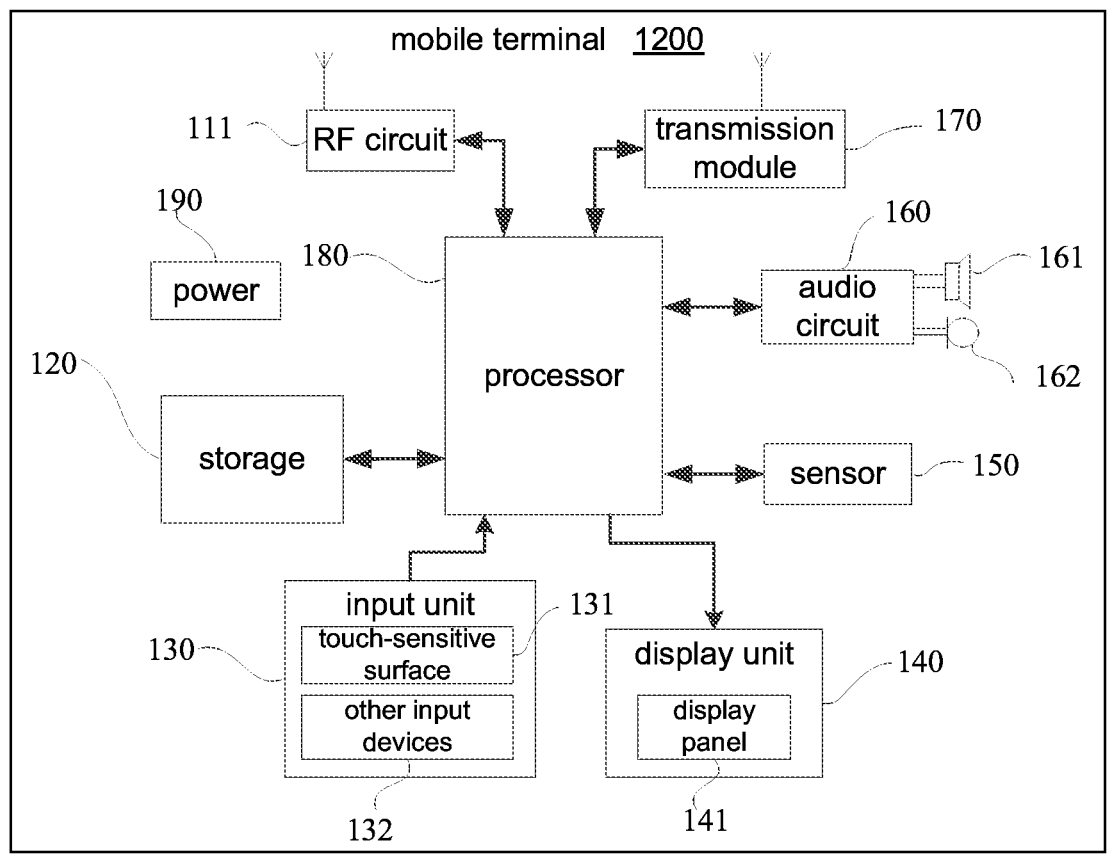
FIG. 4 is a schematic diagram of an embodiment of a mobile terminal according to the present disclosure.

FIG. 4 is a schematic diagram of an embodiment of a mobile terminal according to the present disclosure. The mobile terminal can be used to implement the emergency help method and system based on fingerprint identification for the mobile terminal provided in the foregoing embodiments. The mobile terminal 1200 can be a smartphone or a tablet computer.

As shown in FIG. 4, the mobile terminal 1200 may include a radio frequency (RF) circuit 111, a storage 120 including one or more (only one shown in FIG. 4) computer-readable storage medium, an input unit 130, a display unit 140, a sensor 150, an audio circuit 160, a transmission module 170, a processor 180 with one or more processing cores (only one shown in FIG. 4), and a power supply 190. It should be understood by those skilled in the art that the structure of the mobile terminal 1200 shown in FIG. 4 does not constitute a limitation of the mobile terminal 1200, and may include more or less components than those illustrated, or combine some components or different components arrangement.

In the mobile terminal 1200, an RF circuit 111 is configured to receive and transmit electromagnetic waves, and implement mutual conversion between electromagnetic waves and electrical signals, thereby communicating with a communication network or other devices. The RF circuit 111 may include various existing circuit elements for performing these functions, such as an antenna, a radio frequency transceiver, a digital signal processor, an encryption/decryption chip, a subscriber identity module (SIM) card, and a memory. The RF circuit 111 can communicate with various networks, such as the Internet, an intranet, a wireless network, or communicate with other devices through a wireless network. The wireless network described above may include a cellular telephone network, a wireless local area network, or a metropolitan area network. The abovementioned wireless networks can use various communication standards, protocols, and technologies, including but not limited to Global System for Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi, such as the Institute of Electrical and Electronics Engineers Standard IEEE 802.11a, IEEE 802.11b, IEEE 802.11g and/or IEEE 802.11n), Voice over Internet Protocol (VoIP), Worldwide Interoperability for Microwave Access (Wi-Max), other protocols for mail, instant messaging, and short messages, as well as any other suitable communication protocols, may even include protocols that are not currently being developed.

The storage 120 can be used to store software programs and modules. For example, the program instructions/modules of the emergency help method and system based on the fingerprint identification for the mobile terminal corresponding to the abovementioned embodiments. The processor 180 implements various functional applications and data processing through executing the software programs and the modules stored in the storage 120 to realize the function of emergency help based on fingerprint identification for the mobile terminal. The storage 120 may include high speed RAM, and may also include non-volatile memory, e.g. one or more magnetic storage devices, flash memories, or other non-volatile solid state memories. In some examples, the storage 120 may further include memories remotely located relative to the processor 180, which can be connected to the mobile terminal 1200 through a network. Examples of abovementioned networks include, but are not limited to, the Internet, intranets, local area networks, mobile communication networks, and combinations thereof.

The input unit 130 is configured to receive input numeric or character information and to generate inputs from a keyboard, a mouse, a joystick, optical or trackball signals related to user settings and function controls. Specifically, the input unit 130 may include a touch-sensitive surface 131 and other input devices 132. The touch-sensitive surface 131, also called as a touch display or a trackpad, is configured to collect touch operations of users on or near the touch-sensitive surface 131 (e.g., the operations that a user uses a finger, a stylus, any suitable object or accessory for manipulating on or near the touch-sensitive surface 131) and drive the corresponding connecting device according to a preset program. Alternatively, the touch-sensitive surface 131 may include two portions of a touch detection device and a touch controller, wherein the touch detection device detects touch orientations of the user, and detects signals brought from the touch operations, and transmits the signals to the touch controller. The touch controller receives the touch information from the touch detection device, converts the touch information into contact coordinates, and sends the touch information to the processor 180, and the touch controller is configured to receive and execute commands from the processor 180. In addition, the touch-sensitive surface 131 can be implemented in various types such as resistive, capacitive, infrared, and surface acoustic waves. In addition to the touch-sensitive surface 131, the input unit 130 can also include other input devices 132. Specifically, other input devices 132 may include, but are not limited to, one or more physical keyboards, function keys (such as volume control buttons and switch buttons), a trackball, a mouse, and a joystick.

The display unit 140 can be used to display information input from the user or information provided to the user and various graphical user interfaces of the mobile terminal 1200. The graphical user interfaces can be composed of graphics, texts, icons, videos, and any combination thereof. The display unit 140 may include a display panel 141. Alternatively, the display panel 141 may be configured in the form of a liquid crystal display (LCD), an organic light emitting diode (OLED), or the like. Further, the touch-sensitive surface 131 may cover the display panel 141, and when the touch-sensitive surface 131 detects a touch operation thereon or nearby, the touch operation is transmitted to the processor 180 to determine the type of the touch event, and then the processor 180 according to the type of the touch event provides a corresponding visual output on display panel 141. Although the touch-sensitive surface 131 and display panel 141 shown in FIG. 4 are implemented as two separate components to perform input and input functions, in some embodiments, the touch-sensitive surface 131 can be integrated with the display panel 141 for performing input and output functions.

The mobile terminal 1200 can also include at least one type of sensor 150, such as a light sensor, a motion sensor, and other sensors. Specifically, the light sensor may include an ambient light sensor and a proximity sensor, wherein the ambient light sensor may adjust the brightness of the display panel 141 according to the brightness of ambient light, and the proximity sensor may turn off the display panel 141 and/or a backlight when the mobile terminal 1200 moves to ears. As a kind of motion sensors, a gravity acceleration sensor can detect the magnitude of acceleration in each direction (usually three axes), and detect the magnitude and direction of gravity when it is stationary. The motion sensor can be used to identify gestures of mobile phones (such as horizontal and vertical screen switching, related games, and magnetometer attitude calibration), vibration identification related functions (such as pedometer and tapping), etc. As for gyroscopes, barometers, hygrometers, thermometers, infrared sensors, and other sensors which can be configured with the mobile terminal 1200, these will not be repeatedly described herein.

The audio circuit 160, a speaker 161, and a microphone 162 can provide an audio interface between the user and the mobile terminal 1200. The audio circuit 160 can transmit a converted electrical signal of the received audio data to the speaker 161 for converting sound signal output by using the speaker 161. On the other hand, the microphone 162 converts the collected sound signal into an electrical signal, and then the audio circuit 160 converts the electrical signal into audio data after the audio circuit 160 receives the electrical signal. The audio data are outputted to the processor 180 for processing the audio data, and then the audio data are sent to, for example, another terminal via the RF circuit 111, or the audio data are outputted to the storage 120 for further processing. The audio circuit 160 may also include an earbud jack to provide communication of the peripheral earphones with the mobile terminal 1200.

The mobile terminal 1200 can help the user to send and receive emails, browse web pages, and access streaming media, etc., through the transmission module 170 (e.g., a WiFi module), which provides wireless broadband Internet access for the user. Although FIG. 4 shows the transmission module 170, it should be understood that the transmission module 170 does not belong to the essential configuration of the mobile terminal 1200, and may be omitted as needed without changing the scope of the essence of the present disclosure.

The processor 180 is a control center of the mobile terminal 1200 that connects various portions of the entire mobile phone with various interfaces and circuits. The processor 180 executes various functions and processing data of the mobile terminal 1200 to perform overall monitoring of the mobile phone through running or executing software programs and/or modules stored in the storage 120 and recalling data stored in the storage 120. Optionally, the processor 180 may include one or more processing cores. In some embodiments, the processor 180 may integrate an application processor and a modem processor, wherein the application processor mainly processes an operating system, a user interface, and application programs, etc., the modem processor mainly handles wireless communications. It should be understood that the abovementioned modem processor may not be integrated into the processor 180.

The mobile terminal 1200 also includes a power source 190 (such as a battery) that supplies power for various components. In some embodiments, the power source can be logically coupled to the processor 180 through a power management system to manage charging, discharging, and power consumption by using the power management system. The power supply 190 may also include one or more DC or AC power sources, a recharging system, a power failure detection circuit, a power converter or inverter, a power status indicator, etc.

Although not shown in FIG. 4, the mobile terminal 1200 may further include a camera, a Bluetooth module, etc., and details are not described herein again. Specifically, in this embodiment, the display unit of the mobile terminal is a touch screen display, the mobile terminal further includes a storage, and one or more programs, wherein the one or more programs are stored in the storage and configured to be executed by using one or more abovementioned processor including instructions for performing the following operations:

a user password is set on a setting page of an emergency help function of the mobile terminal, and a fingerprint of a finger is recorded for triggering the help function and adding emergency contact persons and an emergency message;

a switch of the emergency help function is turned on when the emergency contact persons are set and the emergency message is edited completely for automatically sending messages and making phone calls if the emergency help function is triggered, wherein the contact persons are selected from a contact persons list in a phone book of the mobile terminal or the contact persons that are newly added;

current location information is obtained and added into edited emergency message, the emergency message with the location information is sent to all emergency contact persons when an emergency occurs and the mobile terminal recognizes the fingerprint information successfully; and the mobile terminal automatically dials all emergency contact persons' numbers in an order of emergency contact persons after the emergency message with the location information is sent.

Further, in the mobile terminal, in the step of setting the user password on the setting page of emergency help function of the mobile terminal, and recording the fingerprint of the finger to trigger the help function and adding emergency contact persons and the emergency message, the processor is further configured to implement steps of:

the user password is inputted on the setting page of emergency help function for accessing the setting page of emergency help function subsequently when the user enters a backstage interface of the emergency help function of the mobile terminal for the first time;

the fingerprint of the finger is recorded for triggering the help function by using a fingerprint collecting module of the mobile terminal when the user password is set successfully, wherein the finger is one of all fingers of the user;

several emergency contact persons are added in an emergency contact person list after the fingerprint is recorded successfully, wherein the order of the emergency contact persons is set as a first emergency contact person, a second emergency contact person, a third emergency contact person, etc., to an Nth emergency contact person according to an importance of each emergency contact person; and the content of the emergency message is edited and saved for all emergency contact persons, then a switch of the emergency help function is turned on when the emergency contact persons are set completely.

Further, in the mobile terminal, in the step of obtaining current location information and adding the current location information into the edited emergency message, sending the emergency message with the location information to all emergency contact persons when the emergency occurs and the mobile terminal recognizes the fingerprint information successfully, the processor is further configured to implement steps of:

a fingerprint identification module of the mobile terminal receives and verifies the finger information of the prerecorded fingerprint when the emergency occurs;

the prerecorded fingerprint is re-verified or another finger is replaced for verifying if verification of the fingerprint fails, then the help function is triggered if the fingerprint is successfully verified longer than a predetermined time; and the mobile terminal obtains the current location information according to a Global Positioning System (GPS) positioning module and adds the current location information into the edited emergency message, then sends the emergency message with the location information to all emergency contact persons after the help function is triggered.

Further, in the mobile terminal, in the step of the mobile terminal automatically dialing all emergency contact persons' numbers in the order of emergency contact persons after the emergency message with the location information is sent, the processor is further configured to implement steps of:

the mobile terminal sets sending frequencies of the emergency message as five minutes, fifteen minutes, and an hour, the emergency message with location information is sent according to the sending frequencies; and the mobile terminal automatically dials the first emergency contact person's number after the emergency message with location information is sent, a current call is terminated if the fingerprint identification module is pressed again longer than a predetermined time, and then the mobile terminal dials next emergency contact person's number, until all emergency contact persons' numbers are dialed or an emergency contact person takes the call.

Further, in the mobile terminal, times after triggering the emergency help function are set as three phases for within two hours, within twenty-four hours, and within a week respectively.

Further, in the mobile terminal, the predetermined time are five seconds.

Certainly, those skilled in the art can understand that all or part of the processes in the foregoing embodiments can be implemented by a computer program to instruct related hardware (such as a processor and a controller), and the program can be stored in a computer readable storage medium, the program may include the processes of the embodiments of various methods as described above when the program is executed. The storage medium described therein may be a memory, a magnetic disk, an optical disk, or the like.

It should be understood that the application of the present disclosure is not limited to the abovementioned examples, and those skilled in the art can make modifications or changes in accordance with the above description, all of which are within the scope of the appended claims.

What is claimed is:

1. A method of emergency help based on fingerprint identification for a mobile terminal, comprising steps of:

setting a user password on a setting page of an emergency help function of the mobile terminal, recording a fingerprint of a finger to trigger the help function, and adding emergency contact persons and an emergency message;

obtaining current location information and adding the current location information into an edited emergency message, sending the emergency message with the location information to all emergency contact persons when an emergency occurs and the mobile terminal recognizes the fingerprint information successfully; and the mobile terminal automatically dials all emergency contact persons' numbers in an order of emergency contact persons after the emergency message with the location information is sent;

wherein the step of the mobile terminal automatically dials all emergency contact persons' numbers in the order of emergency contact persons after the emergency message with the location information is sent, comprises steps of:

the mobile terminal setting sending frequencies as five minutes, fifteen minutes, and an hour, the emergency message with location information is sent according to the sending frequencies; and the mobile terminal automatically dialing the first emergency contact person's number after the emergency message with location information is sent, a current call being terminated if the fingerprint identification module is pressed again longer than a predetermined time, and then the mobile terminal dialing next emergency contact person's number, until all emergency contact persons' numbers are dialed or an emergency contact person takes the call.

2. An emergency help system based on fingerprint identification for a mobile terminal, comprising a mobile terminal which comprises a processor configured to execute instructions and a storage configured to store the instructions and data, the emergency help system further comprising:

a fingerprint collecting module configured to record a fingerprint of a finger of a user for triggering help function;

a fingerprint identification module configured to receive and verify the finger information of the prerecorded fingerprint;

a Global Positioning System (GPS) positioning module configured to obtains a current location information of the user when an emergency occurs;

a pre-setting module configured to set a user password on a setting page of an emergency help function of the mobile terminal, then configured to record the fingerprint of the finger for triggering help function by using the fingerprint collecting module and add emergency contact persons and an emergency message;

a message sending module configured to obtain the current location information by using the GPS positioning module and add the current location information into an edited emergency message then send the emergency message to all emergency contact persons when an emergency occurs and the fingerprint identification module recognizes the fingerprint information successfully; and an automatic communicating module configured to dial all emergency contact persons' numbers in an order of emergency contact persons after the emergency message with the location information is sent;

wherein the automatic communicating module comprises:

a message sending frequency setting unit configured to set sending frequencies as five minutes, fifteen minutes, and an hour, the emergency message with location information is sent according to the sending frequencies; and a circulating calling unit configured to automatically dial the first emergency contact person's number after the emergency message with location information is sent, a current call being terminated if the fingerprint identification module is pressed again longer than a predetermined time, and then the mobile terminal dialing next emergency contact person's number, until all emergency contact persons' numbers are dialed or an emergency contact person takes the call.

3. A mobile terminal, comprising a processor and a storage, the storage configured to store instructions and data, the processor configured to implement steps of:

setting a user password on a setting page of emergency help function of the mobile terminal, and recording a fingerprint of a finger to trigger a help function and adding emergency contact persons and an emergency message;

turning on a switch of the emergency help function when the emergency contact persons are set and the emergency message is edited completely for automatically sending messages and making phone calls if the emergency help function is triggered; wherein the contact persons are selected from a contact persons list in a phone book of the mobile terminal or the contact persons are newly added;

obtaining current location information and adding the current location information into edited emergency message, sending the emergency message with the location information to all emergency contact persons when an emergency occurs and the mobile terminal recognizes the fingerprint information successfully; and the mobile terminal automatically dialing all emergency contact persons' numbers in an order of emergency contact persons after the emergency message with the location information is sent;

wherein in the step of the mobile terminal automatically dialing all emergency contact persons' numbers in the order of emergency contact persons after the emergency message with the location information is sent, the processor is further configured to implement steps of:

the mobile terminal setting sending frequencies of the emergency message as five minutes, fifteen minutes, and an hour, the emergency message with location information is sent according to the sending frequencies; and the mobile terminal automatically dialing the first emergency contact person's number after the emergency message with location information is sent, a current call being terminated if the fingerprint identification module is pressed again longer than a predetermined time, and then the mobile terminal dialing next emergency contact person's number, until all emergency contact persons' numbers are dialed or an emergency contact person takes the call.

4. The mobile terminal according to claim 3, wherein time after triggering the emergency help function are set as three phases for within two hours, within twenty-four hours, and within a week respectively.

\* \* \* \* \*